March 14, 1933.                F. P. DE WILDE                1,901,554
                     SAFETY CONTROL FOR MOTOR VEHICLES
                            Filed Oct. 11, 1929
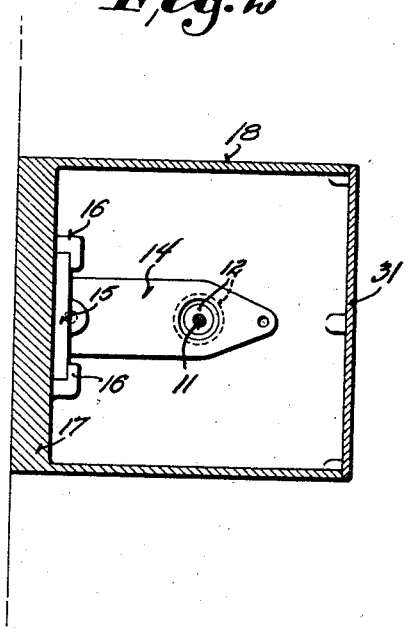
Fig. 2
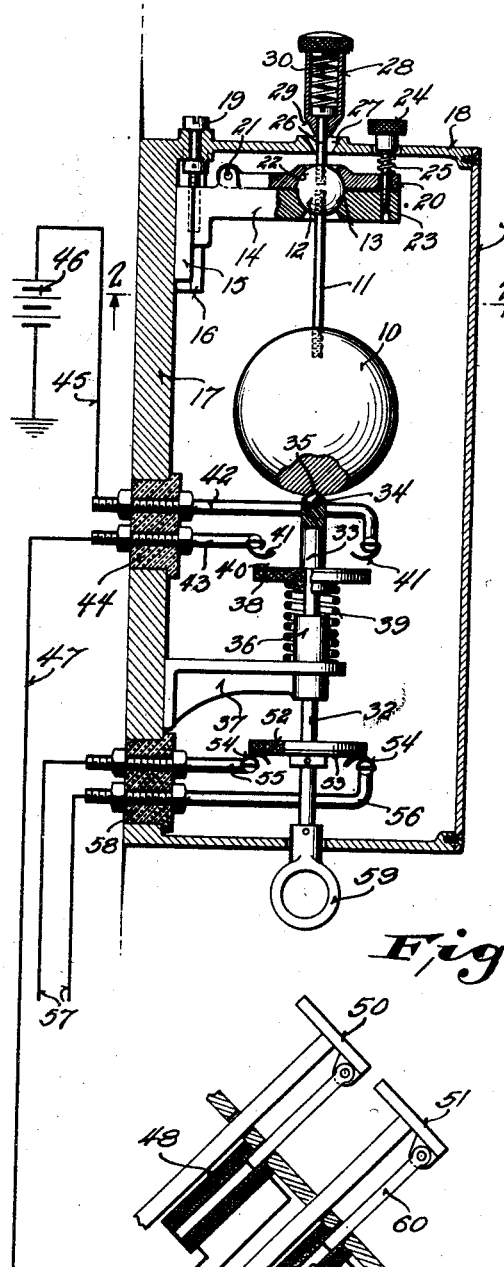
Fig. 1
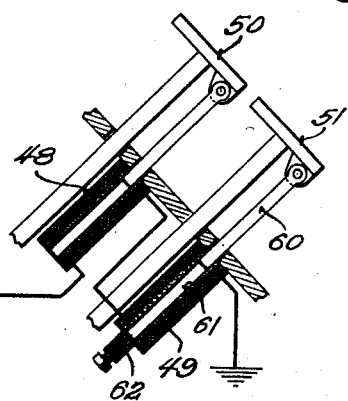
Inventor
Frederick P. DeWilde
By Ralph W. Brown.
Attorney Patented Mar. 14, 1933

1,901,554

UNITED STATES PATENT OFFICE

FREDERICK P. DE WILDE, OF SHEBOYGAN, WISCONSIN

SAFETY CONTROL FOR MOTOR VEHICLES

Application filed October 11, 1929. Serial No. 398,856.

This invention relates to safety controls for motor vehicles.

One object of the present invention is the provision of simple and effective means which will respond to an abrupt change in the rate or direction of motion of a vehicle to automatically stop the motor thereof.

Another object is the provision of inertia actuated means for automatically stopping a motor vehicle.

Other more specific objects and advantages will appear from the following description of an illustrative embodiment of the present invention.

In the accompanying drawing:—

Fig. 1 is a vertical sectional view of a safety control mechanism constructed in accordance with the present invention.

Fig. 2 is a horizontal sectional view on the line 2—2 of Fig. 1.

The control mechanism shown includes an inertia responsive element in the form of a pendulum comprising a ball 10 carried by the lower end of a rod 11 whose upper end is supported by a small ball 12 rockably seated in a semi-spherical socket 13 formed in a bracket arm 14. In this instance the arm 14 is supported by an end plate 15 formed integral therewith and adjustably fixed between a pair of vertical guides 16 secured to the thickened rear wall 17 of a housing 18. The housing 18 is ordinarily mounted on the dash or on some other fixed part of the vehicle. The arm 14 may be raised or lowered by a vertical adjusting screw 19 threaded in the arm and journaled at its upper end in the top of the housing. A clamp bar 20, hinged at one end 21 to the bracket arm 14, is provided with a semi-spherical socket 22 to receive and retain the ball 12 in its seat 13. A clamp screw 23 threaded in the arm 14 projects upwardly through the clamp bar 20 and carries an operating head 24 disposed externally of the housing. A spring 25 on the screw 23 between the head 24 and the clamp bar maintains a clamping pressure between the bar and ball 12 which may be regulated by rotation of the head. The ball and socket joint thus provided permits the ball 10 to swing in any direction but by rotation of the head 24 the clamping pressure upon the ball 12 may be increased or diminished so as to require a greater or less force to swing the ball 10 from the normal position shown.

The ball 10 may be returned to the normal position shown by any appropriate means such as a rod 26 which projects upwardly from the ball 12 through a conical opening 27 formed in the top wall of the housing. A hollow head 28 slidable on the rod 26 is provided with a conical end 29 which, when the head 28 is depressed, coacts with the opening 27 to center the rod 26 and thus return the ball 10 to the normal central position. A spring 30 within the head 28 yieldably retains the head in the upper position shown where it is clear of the opening 27 and does not interfere with the swinging of ball 10. The housing 18 is closed by a removable plate 31 forming the front thereof.

The ball 10 is also yieldably retained in the normal central position shown by a vertical detent rod 32 which supports a head 33 socketed at its upper end to receive and retain a ball 34. The ball 34 normally engages a shallow socket 35 centrally formed in the base of the ball 10. The rod 32 is guided for lengthwise movement within a vertical sleeve 36 supported by a bracket 37 within the housing. A disk 38 of insulating material is carried by the rod 32 and bears against the lower end of the head 33 and a spring 39 between the disk and bracket 37 urges the rod upwardly so as to yieldably retain the ball 34 in engagement with socket 35.

Disk 38 carries a metallic contact ring 40 for cooperation with, but normally spaced from, a pair of contacts 41 carried by rods 42 and 43, respectively, which are supported by a bushing 44 of insulating material fixed in the rear wall of the housing. Rod 42 is connected through a lead 45 with a source of electric energy such as a battery 46, and rod 43 is connected through a lead 47 with a pair of solenoids 48 and 49 for operating the clutch and brake pedals 50 and 51 of the motor vehicle. The arrangement is such that as long as the ball 10 remains in the normal central position shown the contacts 41 are spaced from ring 40 so that the battery circuit is open and the solenoids are ineffective. But whenever the ball 10 is shifted from this position by an unusually abrupt change in the rate or direction of motion of the vehicle, the rod 32 immediately rises under the action of spring 39 to thereby lift the ring 40 into contact with contacts 41 and thus close the battery circuit to thereby energize the solenoids 48 and 49 and thus open the clutch and apply the brakes to stop the vehicle.

In order to prevent a too sudden application of the brakes the armature 60 of the brake operating solenoid 49 is closely fitted within the central bore 61 of the solenoid and the end of the bore is closed by a needle valve 62 which may be adjusted to regulate the escape of air from the bore. By adjustment of this valve the rate of movement of the armature 60 and brake pedal 51 may be regulated as desired.

The rod 32 also carries a second disk 52 which serves to break the ignition circuit of the motor to thus stop the motor whenever the ball 10 is displaced from its normal central position by a sudden change in the rate or direction of motion of the vehicle. In this instance the disk 52 carries a metallic contact ring 53 for contact with two contacts 54 as long as the rod 32 is in the depressed position shown. The contacts 54 are disposed beneath the disk 52 and are supported by rods 55 and 56 which are connected in series in the primary circuit 57 of the motor ignition system and which are supported by a plug 58 of insulating material fixed in the rear wall of the housing. The arrangement is such that when the ball 10 is displaced from the normal position shown so as to permit the rod 32 to rise the ring 53 is automatically lifted out of contact with the contacts 54 so as to break the circuit 57 and thereby stop the motor.

In order to permit return of the ball 10 to the normal position shown the rod 32 is depressed by a pull on an appropriate handle 59 fixed to the lower end thereof and projecting through the bottom of the housing.

It will thus be noted that an exceedingly simple device has been provided which will function automatically to stop the motor and to stop the vehicle upon a sudden change in the rate or direction of travel of the vehicle, such as might be caused striking an obstacle or otherwise. The resistance offered by the engagement of ball 34 in socket 35 and by the clamping pressure upon the ball 12 is sufficient however to retain the ball 10 against displacement during normal operation of the vehicle.

Various changes may be made in the specific embodiment of the invention hereinabove described without departing from or sacrificing the advantages of the invention as defined in the appended claims.

I claim:—

1. In a control device for motor vehicles the combination of a support for mounting on the vehicle, an element movable on said support in response to an abrupt change in vehicle movement, detent means for yieldably retaining said element in one position during normal operation of the vehicle, and means responsive to movement of said element from said position for automatically stopping the motor of the vehicle.

2. In a control device for motor vehicles the combination of a support for mounting on the vehicle, a pendulum on said support movable in response to an abrupt change in vehicle movement, detent means for yieldably retaining said pendulum in one position during normal operation of the vehicle, and means responsive to movement of said pendulum from said position for automatically stopping the motor of the vehicle.

3. In a control device for motor vehicles the combination of a housing for mounting on a vehicle, a pendulum mounted in said housing for movement in response to an abrupt change in vehicle movement, said housing having a tapered opening in one wall thereof, means projecting from said pendulum through said opening for operating said pendulum, said means including an element having a tapered portion for coaction with said opening to position said pendulum, means for yieldably retaining said pendulum in one position, and means responsive to movement of pendulum from said position for stopping the vehicle motor.

4. In a control device for motor vehicles the combination of a support for mounting on a vehicle, an element movable thereon in response to an abrupt change in vehicle movement, said element having a socket therein, a reciprocable member cooperating with said socket to yieldably retain said element in one position, said member being movable upon movement of said element from said position, and means controlled by said member for affecting the operation of the vehicle.

5. In a motor vehicle having a brake pedal the combination of electrical means for operating said pedal, an element movable to effect operation of said means, and a member responsive to an abrupt change in vehicle movement for controlling said element.

6. In a motor vehicle the combination of brake applying means, an element movable in response to an abrupt change in vehicle movement, and electrically actuated means responsive to movement of said element for operating said brake applying means.

7. In a motor vehicle the combination of electrically actuated brake applying means, electrically actuated clutch releasing means, and means responsive to an abrupt change in vehicle movement for rendering both of said means active.

8. In a motor vehicle the combination of an ignition circuit, electrically actuated brake applying means, and means responsive to an abrupt change in vehicle movement for breaking said circuit and for effecting operation of said brake applying means.

In witness whereof, I hereunto subscribe my name this 8th day of October, 1929.

FREDERICK P. DE WILDE.